United States Patent
Ferris et al.

(10) Patent No.: US 6,796,340 B1
(45) Date of Patent: Sep. 28, 2004

(54) METHOD AND DISPENSER FOR PRESSURIZED CONTAINERS USED WITH AUTOMOBILE AIR CONDITIONING SYSTEMS

(75) Inventors: James E. Ferris, Richardson, TX (US); William J. Quest, Dallas, TX (US)

(73) Assignee: E.F. Products, Inc., Dallas, TX (US)

( * ) Notice: Subject to any disclaimer, the term of this patent is extended or adjusted under 35 U.S.C. 154(b) by 0 days.

(21) Appl. No.: 10/444,000

(22) Filed: May 22, 2003

(51) Int. Cl.[7] ............................................. B65B 1/04
(52) U.S. Cl. ..................... 141/67; 141/98; 141/351; 141/383; 141/2; 137/614.04; 251/149.1
(58) Field of Search .......................... 141/2, 18, 67, 141/98, 349–354, 382–386; 137/614.01–614.04; 251/149, 149.1, 149.2

(56) References Cited

U.S. PATENT DOCUMENTS

| | | | |
|---|---|---|---|
| 3,131,733 A | 5/1964 | Monahon | |
| 3,252,475 A | 5/1966 | Jones | |
| 3,448,779 A | 6/1969 | Horwitt | |
| 3,907,012 A | 9/1975 | Burke | |
| 3,976,110 A | 8/1976 | White | |
| 4,535,802 A | 8/1985 | Robertson | |
| 4,644,982 A | 2/1987 | Hatch | |
| 4,895,190 A | 1/1990 | Gillen | |
| 4,903,741 A | 2/1990 | Ibanez | |
| 4,958,501 A | 9/1990 | Nakano et al. | |
| 4,995,417 A | 2/1991 | Naku | |
| 5,037,570 A * | 8/1991 | Gorski et al. ................. 252/68 |
| 5,168,720 A | 12/1992 | Keltner | |
| 5,220,810 A | 6/1993 | Keltner | |
| 5,248,125 A | 9/1993 | Fritch et al. | |
| RE34,781 E * | 11/1994 | Spalink et al. ......... 137/614.05 |
| 5,609,195 A | 3/1997 | Stricklin et al. | |
| 5,626,173 A | 5/1997 | Groult | |
| 5,750,046 A | 5/1998 | Wheeler | |
| 5,826,636 A | 10/1998 | Trigiani | |
| 6,079,444 A | 6/2000 | Harris et al. | |
| 6,089,032 A | 7/2000 | Trachtenberg | |
| 6,296,228 B1 | 10/2001 | Knowles et al. | |
| 6,360,795 B1 | 3/2002 | Bothe et al. | |
| 6,446,453 B1 | 9/2002 | Trachtenberg | |
| 6,467,283 B1 | 10/2002 | Trachtenberg | |
| 6,539,988 B1 | 4/2003 | Cowan et al. | |

OTHER PUBLICATIONS

Figure of Tire Inflator Adapter.
Declaration of Jim Ferris, including Exhibits A and B, discussing, *inter alia*, Adapter Prior Art sold by Precision Valve Corporation.

* cited by examiner

*Primary Examiner*—Steven O. Douglas
*Assistant Examiner*—Peter deVore
(74) *Attorney, Agent, or Firm*—Meyertons, Hood, Kivlin, Kowert & Goetzel, P.C.; Eric B. Meyertons

(57) ABSTRACT

A system and method for dispensing a pressurized fluid from a container into an automobile air conditioning system. A moveable plunger in an interior of a housing may engage an automobile air conditioning system valve and pressurized container valve to allow refrigerant and lubricant to flow from the pressurized container into the automobile air conditioning system. A quick-connect coupling may be used to couple the housing to the automobile air conditioning system after the housing has been snapped onto the pressurized container. In addition, the moveable plunger may be biased toward the automobile air conditioning system valve by a spring to ensure the automobile air conditioning system valve is opened when the housing is coupled to the automobile air conditioning system.

50 Claims, 13 Drawing Sheets

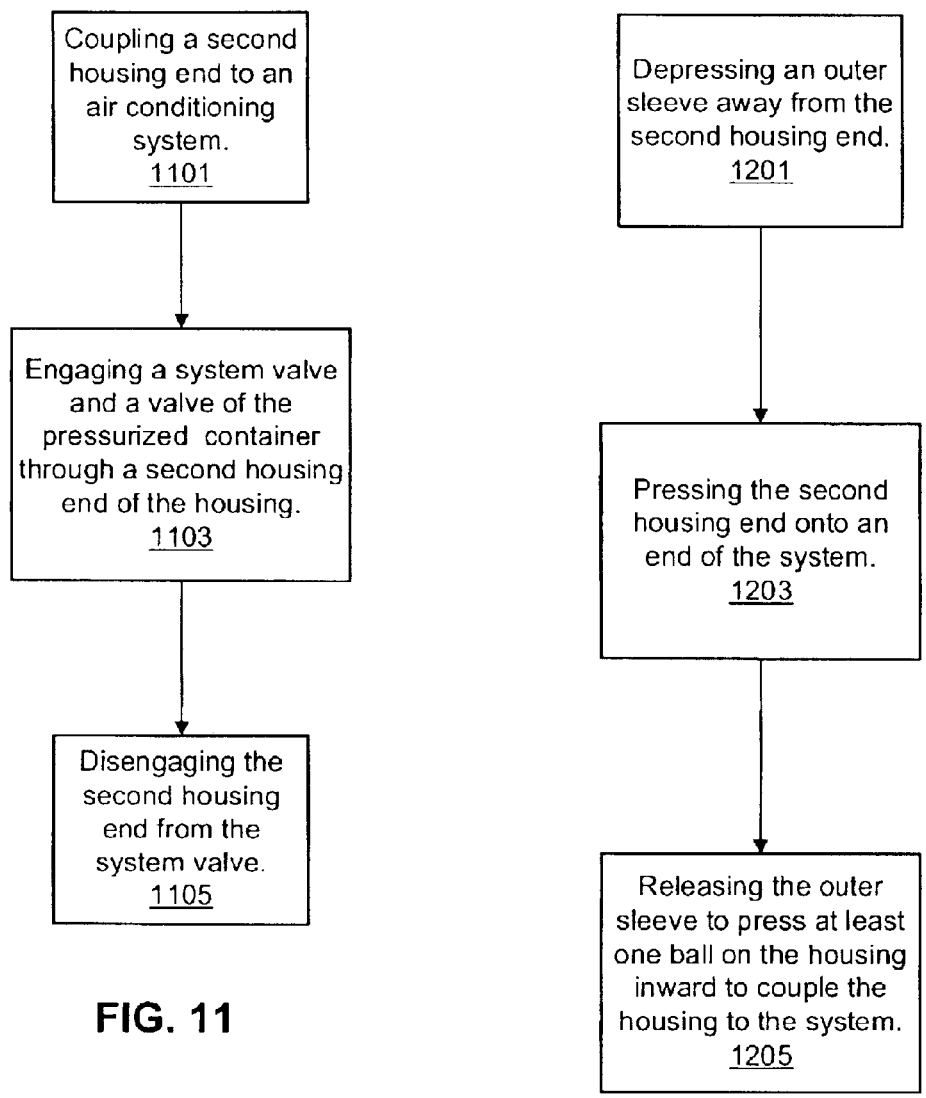

METHOD AND DISPENSER FOR PRESSURIZED CONTAINERS USED WITH AUTOMOBILE AIR CONDITIONING SYSTEMS

BACKGROUND OF THE INVENTION

1. Field of the Invention

The present invention generally relates to dispensers. More particularly, the present invention relates to dispensers for pressurized containers used with automobile air conditioning systems.

2. Description of the Related Art

Pressurized containers may be used to add air or liquid, such as refrigerant, to a system (for example, an automobile air conditioning system). If an automobile air conditioning system has developed a leak or in some other way become damaged, the automobile air conditioning system may lose fluid (e.g., refrigerant and lubricant). A pressurized container of fluid may be used to replace the lost fluid or charge fluids to the automobile air conditioning system. If the contents of the pressurized container are under a higher pressure than the automobile air conditioning system's pressure, the contents of the pressurized container will flow into the automobile air conditioning system if the pressurized container is properly sealed onto the automobile air conditioning system. If the pressurized container is not sealed onto the automobile air conditioning system properly, the contents of the pressurized container and automobile air conditioning system may leak into the atmosphere or not charge properly. In addition, the automobile air conditioning system being charged may lose additional fluid. In many cases, the fluid being replaced may be costly and/or pose environmental hazards. Therefore, fluid leakage may need to be minimized.

A prior art dispenser for dispensing a fluid from a pressurized container into an automobile air conditioning system is shown in U.S. Pat. No. 6,539,988 (the '988 Patent). U.S. Pat. No. 6,539,988 titled "Pressurized Container Adapter For Charging Automotive Systems", which was filed Dec. 28, 2001, is hereby incorporated by reference in its entirety as though fully and completely set forth herein. The dispenser described in the '988 Patent uses a "freely moveable" core depressor inside a housing to engage a valve on a pressurized container and a valve on a service port of an automobile air conditioning system as the valve on the pressurized container is moved toward the valve on the service port. The dispenser described in the '988 Patent generally has a force applied by the user to the container and/or dispenser during the fluid transfer from the pressurized container to the automobile air conditioner. During longer transfers of fluid, the user may experience fatigue. In addition, the core depressor inside the housing is freely moveable which may, in some circumstances, lead to inconsistent contact between the core depressor and the pressurized container valve and system valve. In addition, because of the shape of the O-ring used between the dispenser and the pressurized container, the dispenser may leak due to an inadequate seal. Furthermore, the dispenser described in the '988 patent does not appear to have a seal to inhibit fluid leakage if the core depressor engages the pressurized container without engaging the service port. The resulting fluid leaked may be costly and/or pose environmental hazards.

SUMMARY OF THE INVENTION

In an embodiment, a housing with a hollow interior and a moveable plunger to engage a pressurized container valve and an automobile air conditioning system valve may be used to transfer fluid between a pressurized container and an automobile air conditioning system. As used herein, "automobile" may include cars, trucks, and other vehicles. The housing may have a first housing end and a second housing end to engage the pressurized container valve and the automobile air conditioning system valve, respectively. In certain embodiments, the moveable plunger may have a pressurized container valve engaging end accessible through the first housing end and an automobile air conditioning system valve engaging end accessible through the second housing end. In some embodiments, the first housing end may couple the housing to a pressurized container such that a pressurized container valve on the pressurized container is aligned with the pressurized container valve engaging end of the plunger. In an embodiment, the second housing end may engage an automobile air conditioning system such that an automobile air conditioning system valve is accessible by the automobile air conditioning system valve engaging end of the plunger. In an embodiment, a plunger may engage the automobile air conditioning system valve when a force is applied through the plunger by the pressurized container valve.

In an embodiment, the plunger and housing may include a space between the plunger and the housing to allow a fluid to flow between the plunger and the interior of the housing when the plunger engages the automobile air conditioning system valve and the pressurized container valve. For example, the space may be a longitudinal groove along the length of the plunger. In certain embodiments, the first housing end may have a lip for snapping the housing onto the pressurized container. In addition, a flat washer may be used to provide a seal to inhibit fluid leakage between the first housing end and the pressurized container.

In some embodiments, the plunger may engage the automobile air conditioning system valve when a user pushes the housing against the automobile air conditioning system to depress the plunger against both the automobile air conditioning system valve and the pressurized container valve. In an embodiment, a spring located inside the hollow interior may bias the moveable plunger. The spring may inhibit rotation and bias the moveable plunger forward to form a seal when the moveable plunger is not engaging the automobile air conditioning system.

In some embodiments, a second housing end may couple a housing to an automobile air conditioning system valve using a quick-connect coupling. In some embodiments of the quick-connect coupling, the second housing end may have a bearing moveably disposed in a side of the second housing end. In some embodiments, a portion of the bearing may be inside the interior while another portion of the bearing is outside the housing. An outer sleeve may be slideably mounted to the second housing end such that a portion of the bearing is engageable with an outer sleeve when the outer sleeve is slid over the portion of the housing with the bearing. In some embodiments, when the outer sleeve is slid over the bearing, the bearing may be biased toward the interior of the housing to engage the automobile air conditioning system and couple the second housing end to the automobile air conditioning system. In certain embodiments, the outer sleeve may be biased to an outer position over the bearings by a spring. In an embodiment, the outer sleeve may be moved to an inner position when a force is applied by a user to a ridge on the outer sleeve in a direction opposing the biasing spring. Other quick-connect coupling configurations may also be used. The quick-connect coupling may allow a user to couple the housing to the automobile air conditioning system without having to apply continuous force from the user.

BRIEF DESCRIPTION OF THE DRAWINGS

Advantages of the present invention may become apparent to those skilled in the art with the benefit of the following detailed description of the preferred embodiments and upon reference to the accompanying drawings in which:

FIG. 11 illustrates a flowchart for coupling the housing to the automobile air conditioning system, according to one embodiment.

FIG. 12 illustrates a flowchart for coupling the housing to the automobile air conditioning system using the slideably engageable housing, according to one embodiment.

Figure 1:
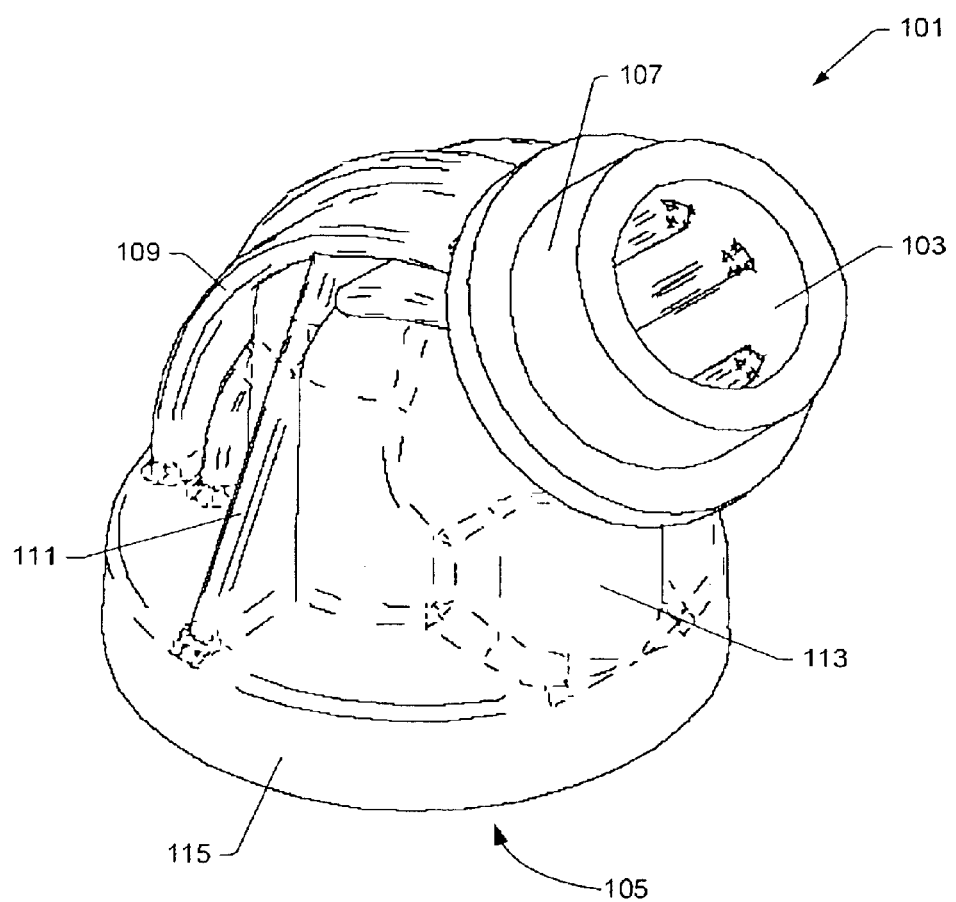
FIG. 1 illustrates a housing for coupling a pressurized container to an automobile air conditioning system, according to one embodiment.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 illustrates an embodiment of a housing for coupling a pressurized container to an automobile air conditioning system. In an embodiment, housing 101 may be used to couple a pressurized container to an automobile air conditioning system. The pressurized container may be used to supply additional fluid such as, but not limited to, refrigerant and lubricant to the automobile air conditioning system. For example, the refrigerant may be R134a and the lubricant may be polyalkylene glycol (PAG). Other refrigerants, such as but not limited to, R12 may also be used. Other lubricants, such as, but not limited to, ester, methanol, and ketone may be used. In some embodiments, the percent of refrigerant in the fluid may be approximately in the range of 50 to 80 percent. Other percentages may also be used. For example, the fluid may contain R134a refrigerant and PAG in a mixture approximately in the range of 50 to 80 percent refrigerant by volume (or, in some embodiments, approximately in the range of 10 to 50 percent refrigerant by volume (e.g., ⅓ to ½), or in other embodiments, approximately in the range of 80 to 100 percent refrigerant by volume). In an embodiment, the fluid may only include a refrigerant.

In certain embodiments, the housing may include a hollow interior with a moveable plunger engageable with a pressurized container valve and an automobile air conditioning system valve (e.g., a service port) to conduct fluid from a pressurized container to the automobile air conditioning system. The hollow interior for the moveable plunger may be substantially cylindrical, although other shapes can also be used. In an embodiment, housing 101 may include first housing end 105 at one end of the hollow interior. First housing end 105 may couple housing 101 at base 115 to the pressurized container. Second housing end 103 at a second end of the hollow interior may be used to engage an automobile air conditioning system valve. In an embodiment, a quick-connect coupling may be used to couple the second housing end 103 to the automobile air conditioning valve.

In an embodiment, second housing end 103 of housing 101 may engage an automobile air conditioning system. A nozzle for a valve of the automobile air conditioning system may enter second housing end 103 and form a seal with the interior of entrance tube 107. In certain embodiments, housing 101 may allow a user to apply pressure to the automobile air conditioning system valve by depressing the automobile air conditioning system valve with the plunger as the automobile air conditioning system valve enters the interior of entrance tube 107. In an embodiment, a quick-connect coupling may be used to couple the second housing end 103 to the automobile air conditioning system valve. In an embodiment, the plunger may be in a position in the interior of entrance tube 107 to depress the automobile air conditioning system valve if the plunger is biased on one end by the pressurized container valve. In some embodiments, one end of the plunger may not be biased by the pressurized container valve (e.g., if the pressurized container is not yet coupled to the housing) and the plunger may not be in a position to depress the automobile air conditioning system valve. In an embodiment, the moveable plunger may move back and forth along a predetermined path in the hollow interior. In some embodiments, the plunger may be biased by a spring located inside the hollow interior. In some embodiments, various types of spring may be used, including helical, tapered, and other types of compression springs. In addition, other biasing means besides a spring may be used to bias the moveable plunger.

In certain embodiments, second housing end 103 may lie in a plane at an angle relative to a plane of first housing end 105 (as shown in FIG. 1). In some embodiments, second housing end 103 may lie in a plane that is substantially parallel to a plane of first housing end 105. Other housing configurations may also be contemplated. Housing 101 may be plastic. Other materials for the housing 101 may also be contemplated (e.g., metal, ceramics, polymers). Housing may have several supporting structures. Ridge 111 and rounded ridge 109 may support housing 101. Support 113 may support housing 101. Supports 111, 109, and 113 may be part of a molded housing 101. In another embodiment, the supports 111, 109, and 113 and/or other supports may be separate supports that are added or coupled to the housing 101.

Figure 2:
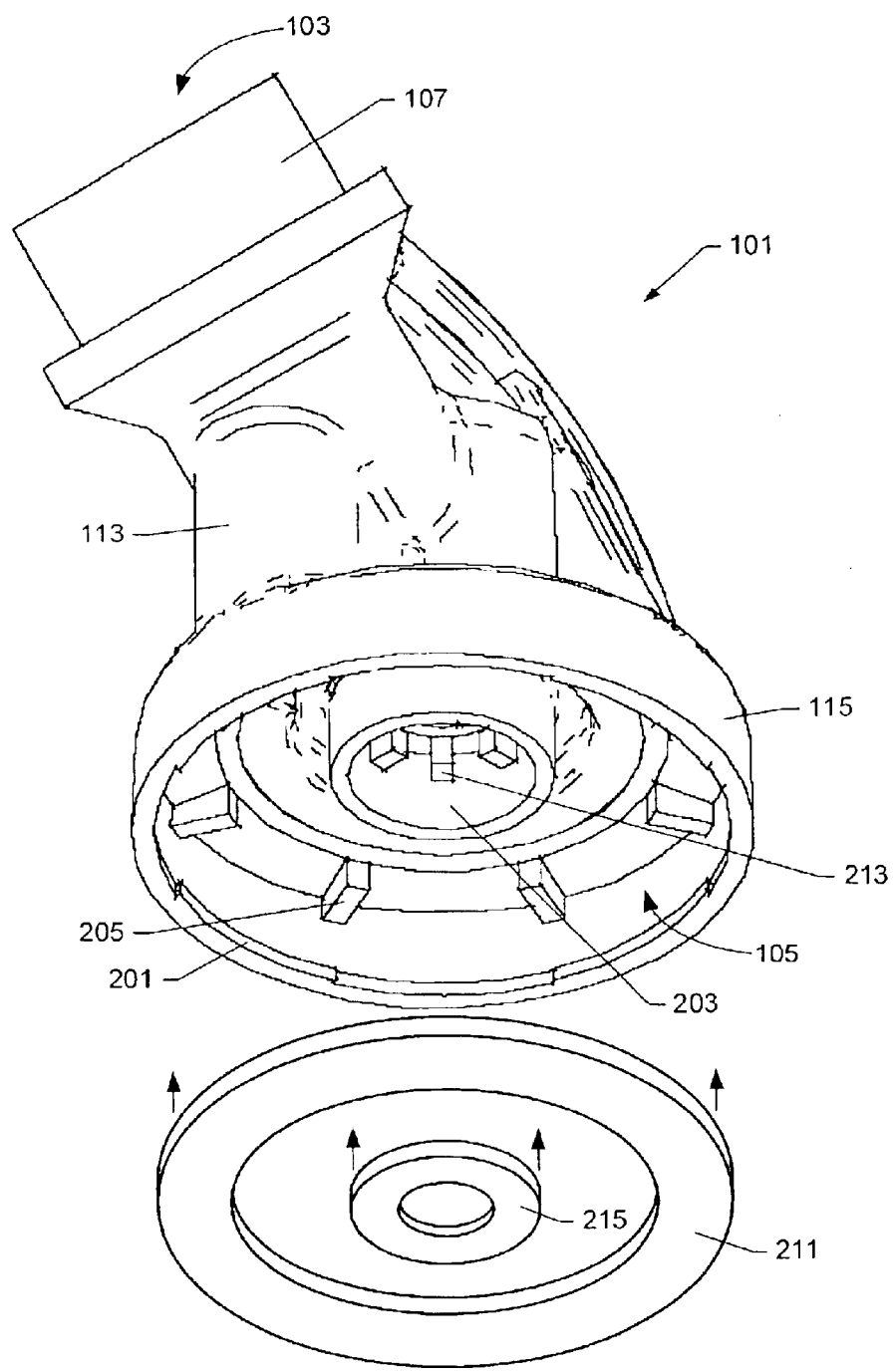
FIG. 2 illustrates a bottom view of the housing for coupling the pressurized container to the automobile air conditioning system, according to one embodiment.
Figure 3:
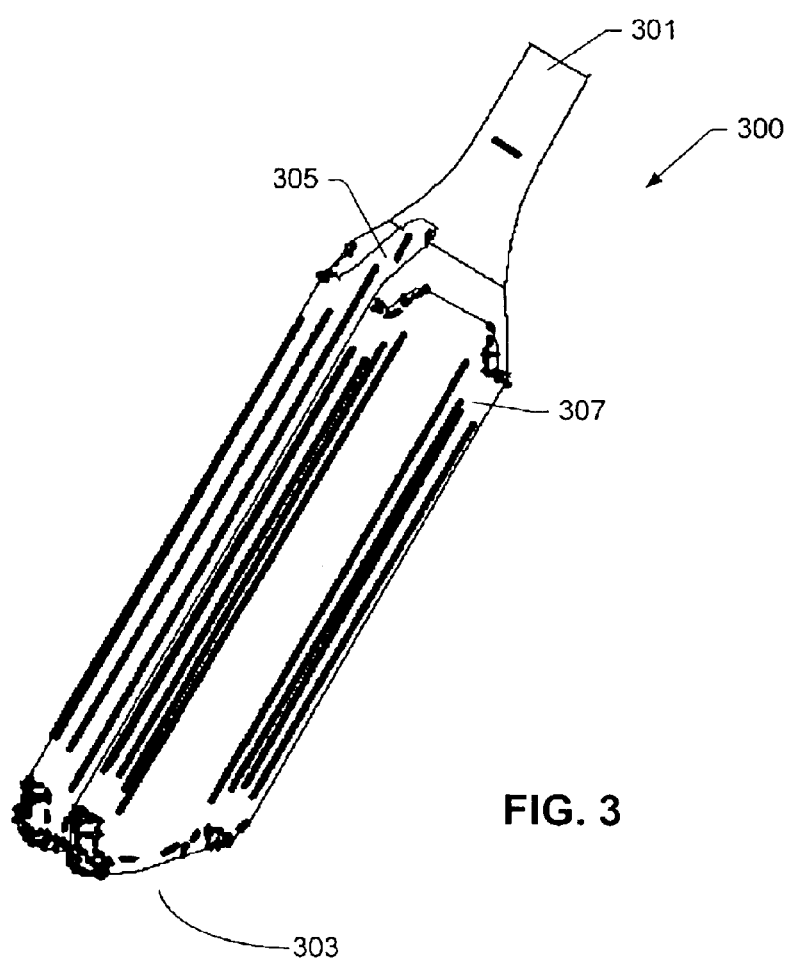
FIG. 3 illustrates a plunger, according to one embodiment.
Figure 4:
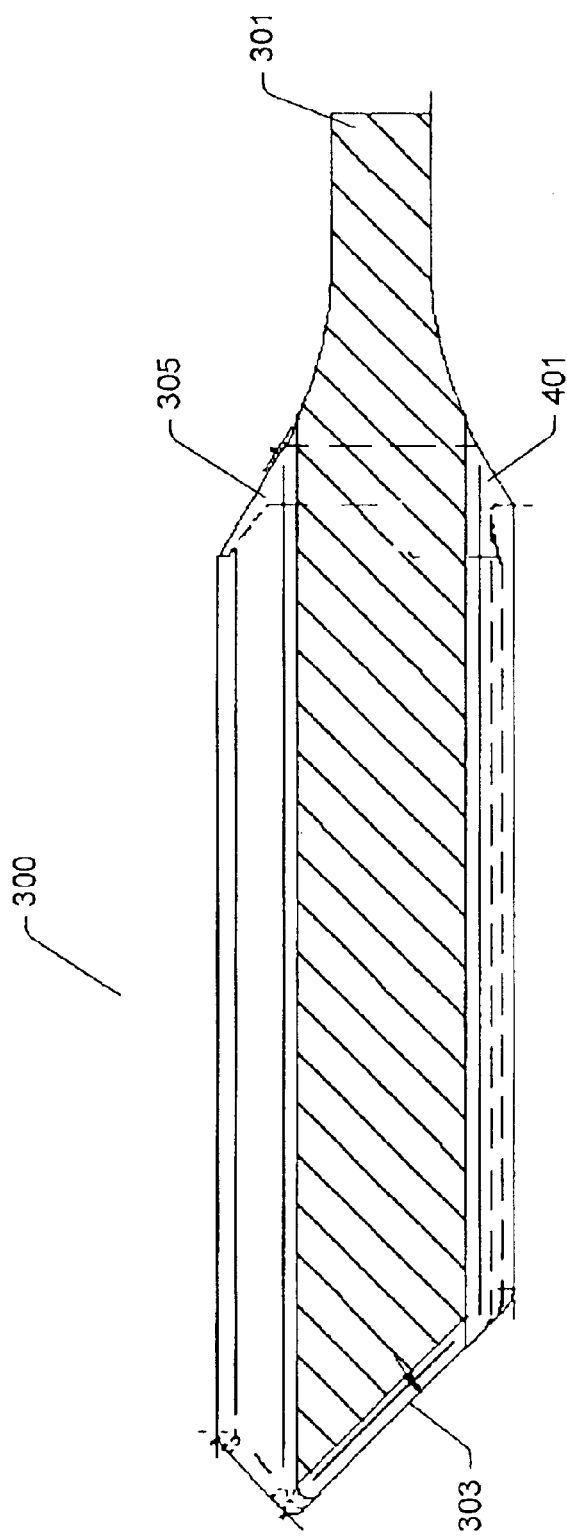
FIG. 4 illustrates a side view of the plunger, according to one embodiment.
Figure 5:
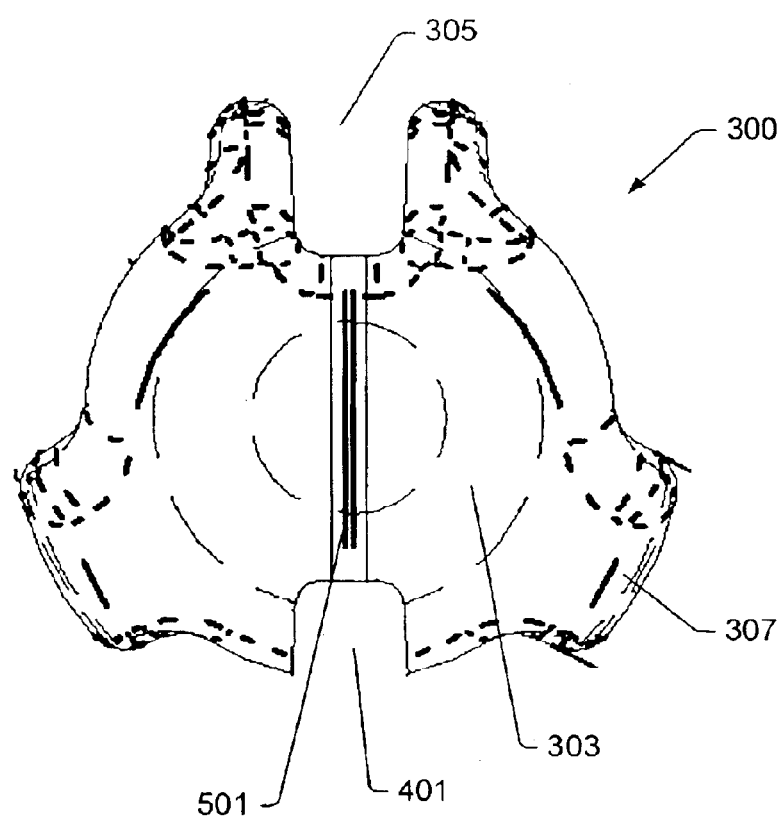
FIG. 5 illustrates a front view of the plunger, according to one embodiment.

Referring to FIG. 2, a bottom view of an embodiment of housing 101 is shown. In an embodiment, the plunger may be accessible through lower valve opening 203 to engage a pressurized container valve. Ridge 201 on base 115 may couple (or mate) with a ridge or outcropping on a pressurized container to hold housing 101 onto the pressurized container. In certain embodiments, spacers 205 may position a flat washer 211 to engage with and form a seal with a pressurized container in base 115. In addition, other flat washers may be used such as, but not limited to, a smaller flat washer 215 to engage spacers 213 to form an inner seal. The flat washers may be made of rubber. Other materials for the flat washers may also be used. It is believed that the flat washers will work better than the O-Ring (34 as seen in FIGS. 3–5 of the '988 Patent) described in the '988 Patent. The flat washers may allow for a better seal than the O-Rings (34) which may not fully engage the pressurized container.

Base 115 may position the pressurized container to align the pressurized container valve with the plunger. In an embodiment, a plunger may slide between the first housing end and the second housing end without depressing either the pressurized container valve or the automobile air conditioning system valve until both are engaged with opposing ends of the plunger. This may inhibit opening the pressurized container valve to allow fluid out when the automobile air conditioning system valve has not also been engaged to accept fluid. In the same manner, the automobile air conditioning system valve may not be opened to release fluids from the automobile air conditioning system without a pressurized container providing pressurized fluid to inhibit an escape of fluids from the automobile air conditioning system. Other housing configurations may be used to couple housing 101 to a pressurized container. For example, instead of a ridge 201, snaps may be used to couple housing 101 to the pressurized container. In some embodiments, housing 101 may be formed as a portion of the top of a pressurized container.

FIG. 3 illustrates an embodiment of a plunger that may be used in the interior of housing 101. In an embodiment, plunger 300 may include pressurized container valve engaging end 303 and automobile air conditioning system valve engaging end 301. In certain embodiments, plunger 300 may be moveably disposed between the first housing end and the second housing end. Plunger 300 may be moveably disposed such that when the pressurized container valve engaging end of the plunger engages a pressurized container valve the plunger may be pushed along the interior of the housing to engage an automobile air conditioning system valve with automobile air conditioning system valve engaging end 301.

In some embodiments, pressurized container valve engaging end 303 may have a slanted end (as shown in FIG. 4). The slanted end may allow pressurized valve engaging end 303 to engage the pressurized container valve with a substantially flat end while plunger 300 is in an angled housing. In certain embodiments, pressurized container valve engaging end 303 may have a pointed structure to engage the pressurized container valve. In other embodiments, pressurized container valve engaging end 303 may have a substantially non-angled end (e.g., if the plunger is used in a substantially straight housing). A non-angled pressurized container valve engaging end 303 may be used in an angled housing and may engage the pressurized container valve at an angle. Other configurations of pressurized container valve engaging end 303 may also be used.

In an embodiment, automobile air conditioning system valve engaging end 301 may have a round cross section with a smaller diameter than the rest of plunger 300. For example, the automobile air conditioning system valve engaging end 301 may engage a Schrader type valve which allows fluid flow around a central piston of the Schrader valve when the central piston is depressed. The diameter of automobile air conditioning system valve engaging end 301 may be smaller than the rest of plunger 300 to allow fluid to flow around the automobile air conditioning system valve engaging end. In some embodiments, automobile air conditioning system valve engaging end 301 may have a similar configuration as the pressurized container valve engaging end described above. Other configurations for automobile air conditioning system valve engaging end 301 may also be used (e.g., a Presta valve configuration). Generally, pressurized container valve engaging end 303 and/or automobile air conditioning system valve engaging end 301 have a shape or configuration that will engage or couple to a desired pressurized container or automobile air conditioning system.

In an embodiment with both the pressurized container valve and the automobile air conditioning system valve engaged by plunger 300, fluid from the pressurized container may move up space 305 between longitudinal grooves in the plunger and the inside walls of the housing interior. In certain embodiments, guides 307 may fit in grooves in the interior of the housing to guide plunger 300 toward the automobile air conditioning system valve as the plunger moves in the interior of the housing. In some embodiments, guides 307 may also inhibit rotation of plunger 300. Some embodiments of the plunger 300 may not have guides 307. Some embodiments of the plunger 300 may not have longitudinal grooves to provide space 305. Plunger 300 may have smaller outer dimensions than the dimensions of the interior of the housing to allow fluid to flow along the sides of the plunger. In certain embodiments, holes may be disposed in plunger 300 to allow fluid to flow through the plunger. For example, a hole may run through the automobile air conditioning system engaging end of plunger 300 to the pressurized container valve engaging end.

FIG. 4 illustrates a side view of an embodiment of plunger 300. In an embodiment, fluid may flow through space 305 provided between longitudinal grooves in plunger 300 and the interior of the housing. In some embodiments, plunger 300 may provide additional space 401. Space 401 may be provided between an additional longitudinal groove in the plunger and the interior of the housing. As shown in FIG. 4, a pressurized container valve engaging end 303 may have a slanted end that allows a substantially perpendicular force to be applied through the pressurized container valve end when plunger 300 is in contact with the pressurized container valve. The tip of automobile air conditioning system valve engaging end 301 may have a concave interior surface to better engage an automobile air conditioning system valve. In some embodiments, automobile air conditioning system valve engaging end 301 may have a substantially flat tip. In certain embodiments, the automobile air conditioning system valve engaging end may have a hole that runs through the interior of plunger 300 to allow fluid to flow inside the plunger.

FIG. 5 illustrates an end on view of pressurized container valve engaging end 303 in an embodiment of plunger 300. Pressurized container valve engaging end 303 may have groove 501 to allow fluid to flow from the pressurized container valve into spaces 305 and/or 401. In some embodiments, the pressurized container valve engaging end may have holes to allow fluid to flow to spaces 305 and 401.

FIG. 5 shows plunger 300 with a substantially round outer perimeter; however, other shapes of a plunger may also be used. For example, plunger 300 may have an oblong or square outer perimeter. In an embodiment, plunger 300 may be plastic. Plunger 300 may include other materials such as, but not limited to, metal, polymers, etc. Plunger 300 may be one material or a combination of materials. For example, the pressurized container valve engaging end and the automobile air conditioning system valve engaging end may be made of metal or have metal caps while the rest of the plunger is plastic.

Figure 6:
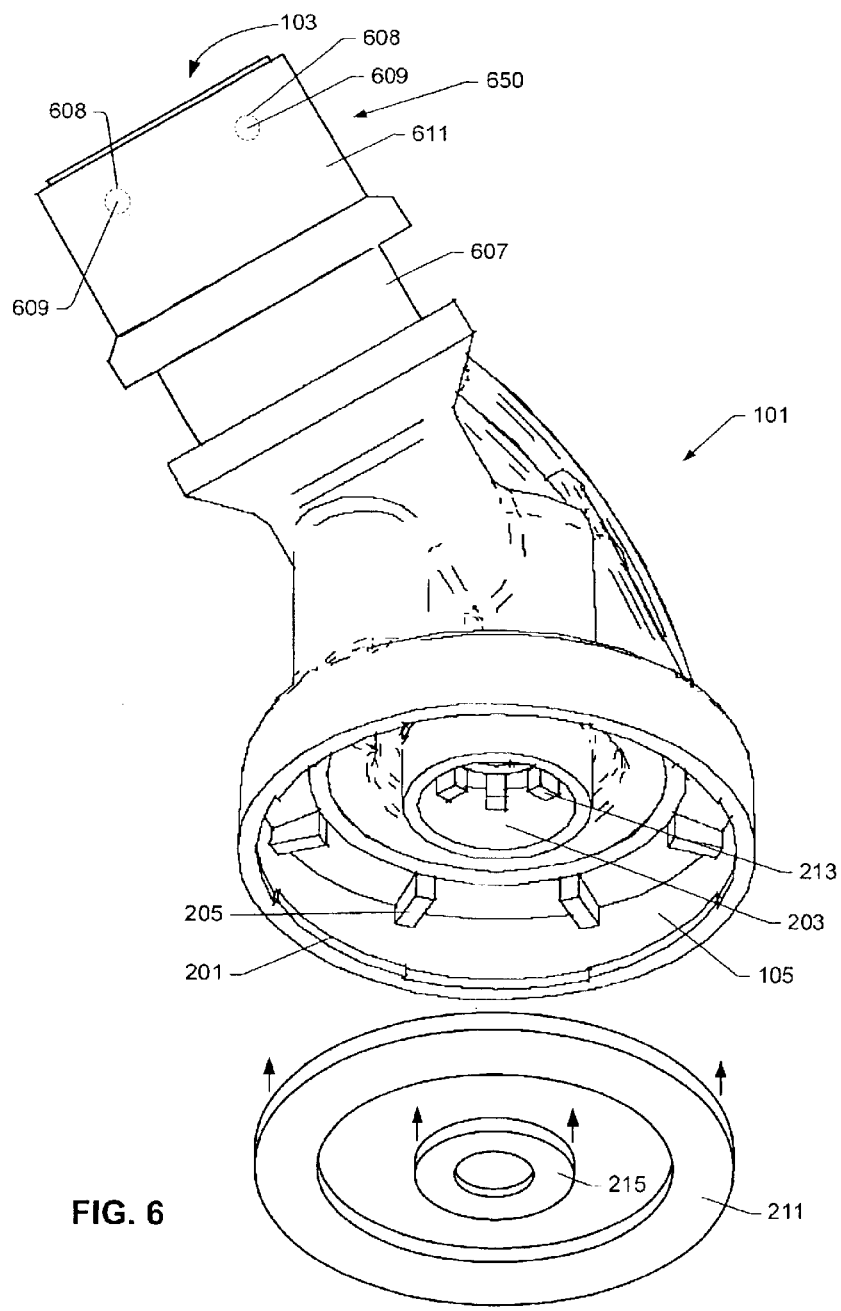
FIG. 6 illustrates a housing with a slideably engageable outer sleeve in a closed position, according to one embodiment.

FIG. 6 illustrates an embodiment of a housing with a quick-connect coupling in a closed position. In an embodiment, quick-connect coupling 650 may comprise a slideable outer sleeve 611 engageable with bearings 609 in the side of housing 101 to push bearings 609 inward to couple the second housing end 103 to an automobile air conditioning system. The quick-connect coupling 650 may allow a user to engage an automobile air conditioning system valve without the user having to apply pressure during the entire fluid transfer. The quick-connect coupling 650 may couple the housing to the automobile air conditioning system during fluid transfer and allow a user to quickly uncouple housing 101 when the fluid transfer is done. While an embodiment of quick-connect coupling 650 is shown with slideable outer sleeve 611 and bearings 609, other configurations of the quick-connect coupling may also be used. For example, screws, snaps, or squeezable mountings may be used.

Figure 7A:
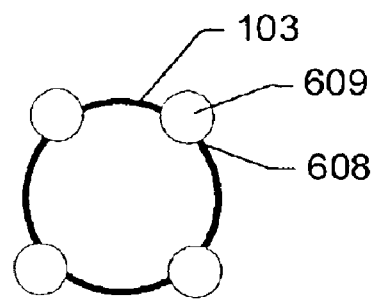
FIGS. 7a and 7b illustrate the outer sleeve and bearing used in a quick-connect coupling, according to one embodiment.

In an embodiment of quick-connect coupling 650, outer sleeve 611 may be biased toward second housing end 103 by a spring. Outer sleeve 611 may push bearings 609 inward to couple housing 101 to an automobile air conditioning system valve (for example, by catching a lip of the automobile air conditioning system valve). As shown in FIG. 7a, bearings 609 may be loosely coupled to housing 101 in holes 608.

Figure 7B:
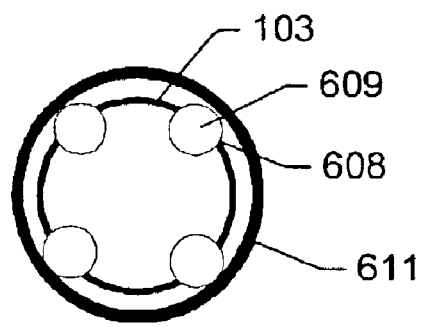

In certain embodiments, a hole in the side of the housing 101 for the bearings 609 may have a smaller inside diameter (inside the housing 101) than an outer diameter on the outside of the housing 101. The bearings may fit through the outer diameter, but not fit fully past the inner diameter. An outer sleeve 611 may keep the bearings inside holes by not depressing fully past the bearings. Other configurations for the holes 608 are also contemplated. As outer sleeve 611 passes over bearings 609, the bearings may be pushed inward to secure an automobile air conditioning system valve. For example, a lip of the automobile air conditioning system valve may fit past bearings 609 when the bearings are loose (i.e., outer sleeve 611 is not biasing the bearings 609 inward), but not be able to back out of housing 101 when the bearings are biased inward by the outer sleeve (as shown in FIG. 7b). The spring to bias outer sleeve 611 may be between outer sleeve 611 and housing 101. In some embodiments, outer sleeve 611 may be biased by a different mechanism. In certain embodiments, outer sleeve 611 may not be biased.

Figure 8:
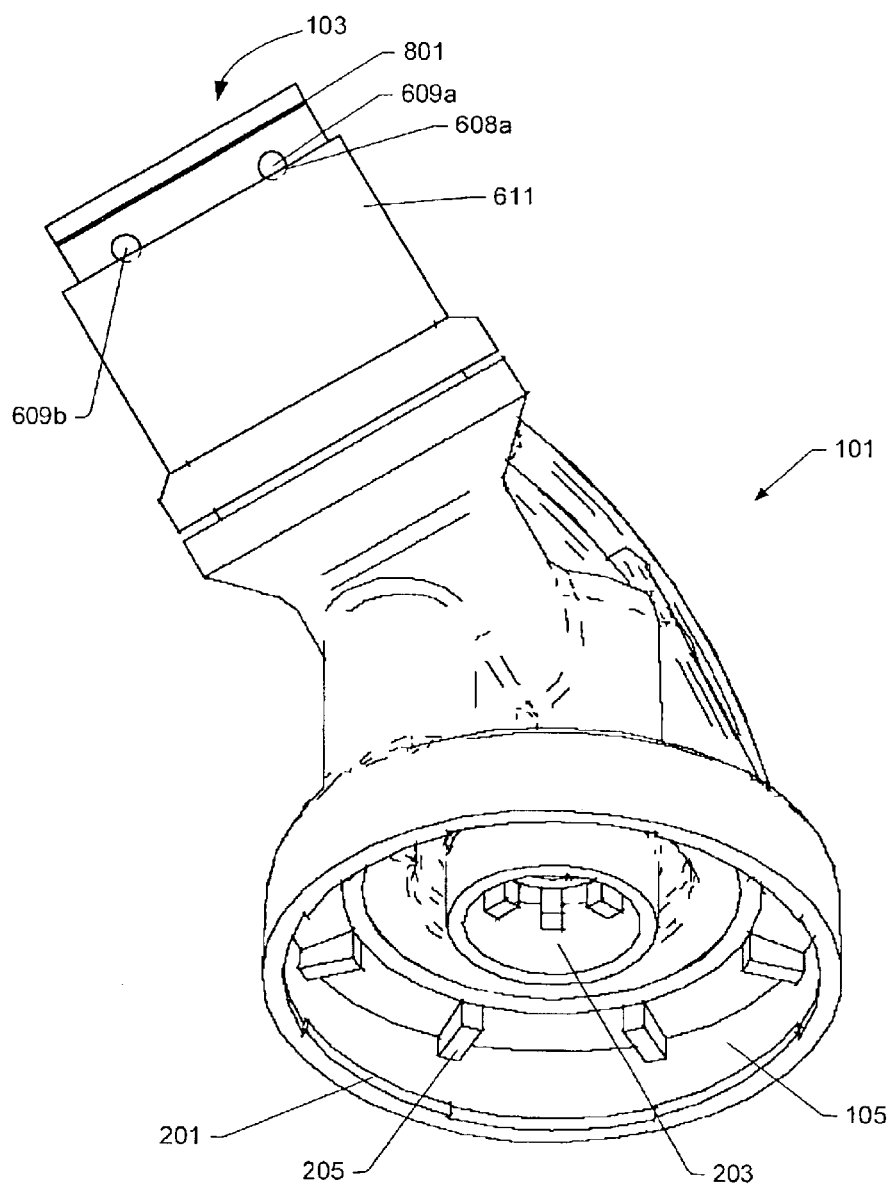
FIG. 8 illustrates the housing with the slideably engageable outer sleeve in an open position, according to one embodiment.

FIG. 8 illustrates an embodiment of housing 101 with outer sleeve 611 in an open position. Outer sleeve 611 may be depressed to allow bearings 609 to move in holes 608. In an embodiment, outer sleeve 611 may not be depressible fully past the bearings 609 to keep the bearings 609 within the housing 101. In an embodiment ring 801 may be on housing 101 near second housing end 103. Ring 801 may be embedded in the wall of housing 101. In some embodiments, ring 801 may be around an outside of housing 101. Other rings may also be disposed on, in, or around the housing 101.

In an embodiment, a ring may provide a seal and/or may define outer limits for movement of the outer sleeve 611. Ring 801 may be made of metal or other materials. In certain embodiments, housing 101 may not have ring 801.

Figure 9A:
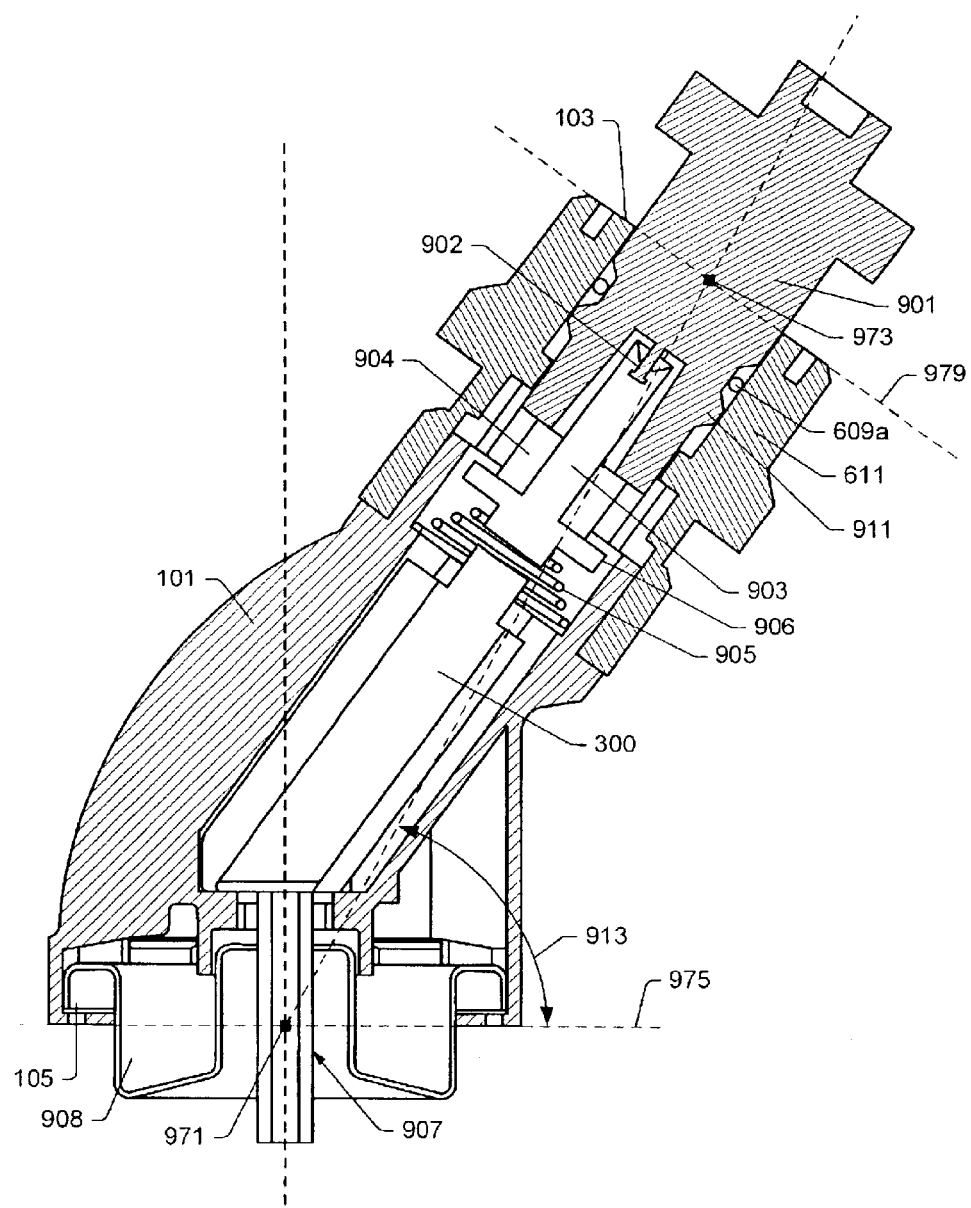
FIGS. 9a, 9b, and 9c illustrate cross-sectional views of different angled housings including a spring biased plunger, according to one embodiment.
Figure 9B:
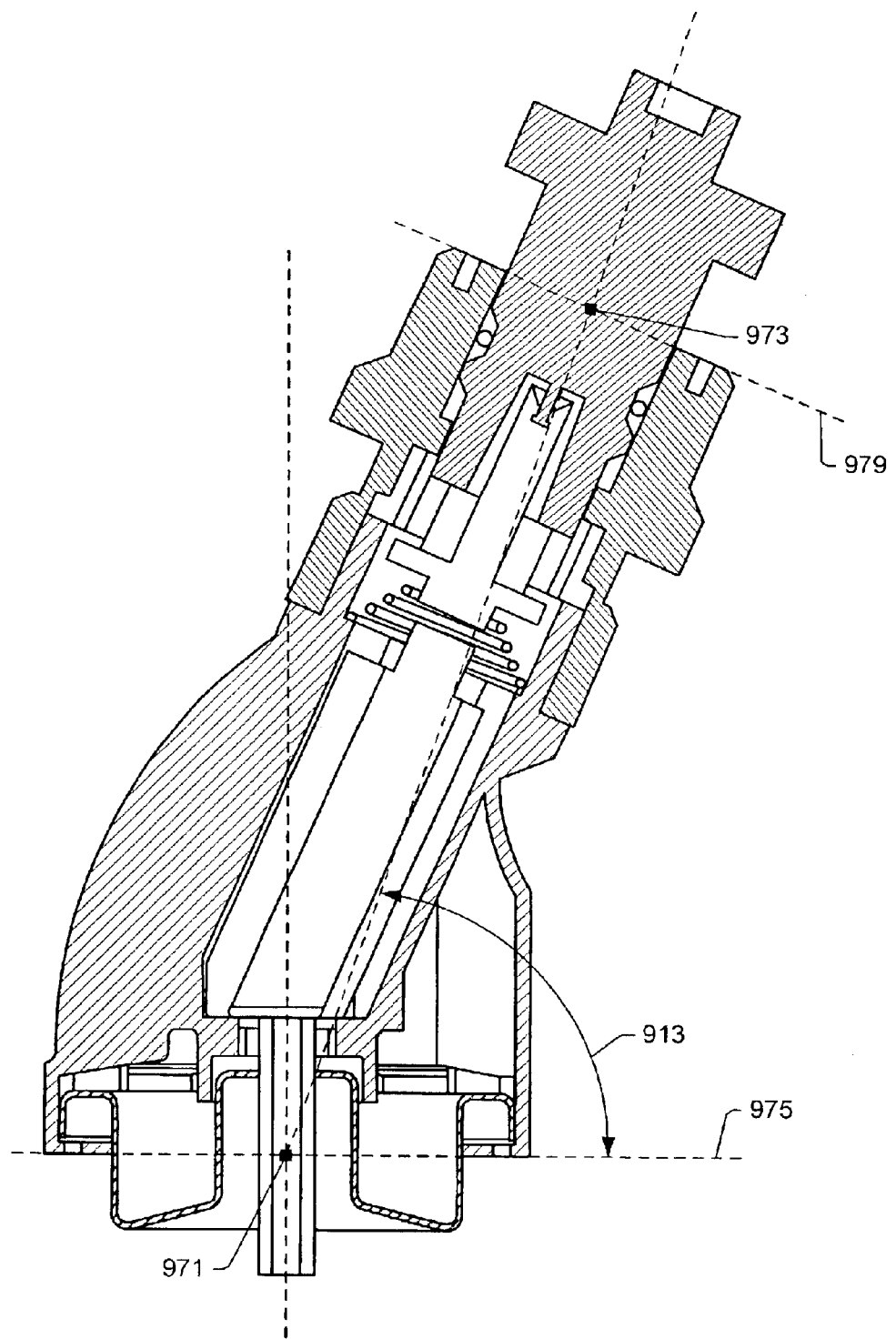
Figure 9C:
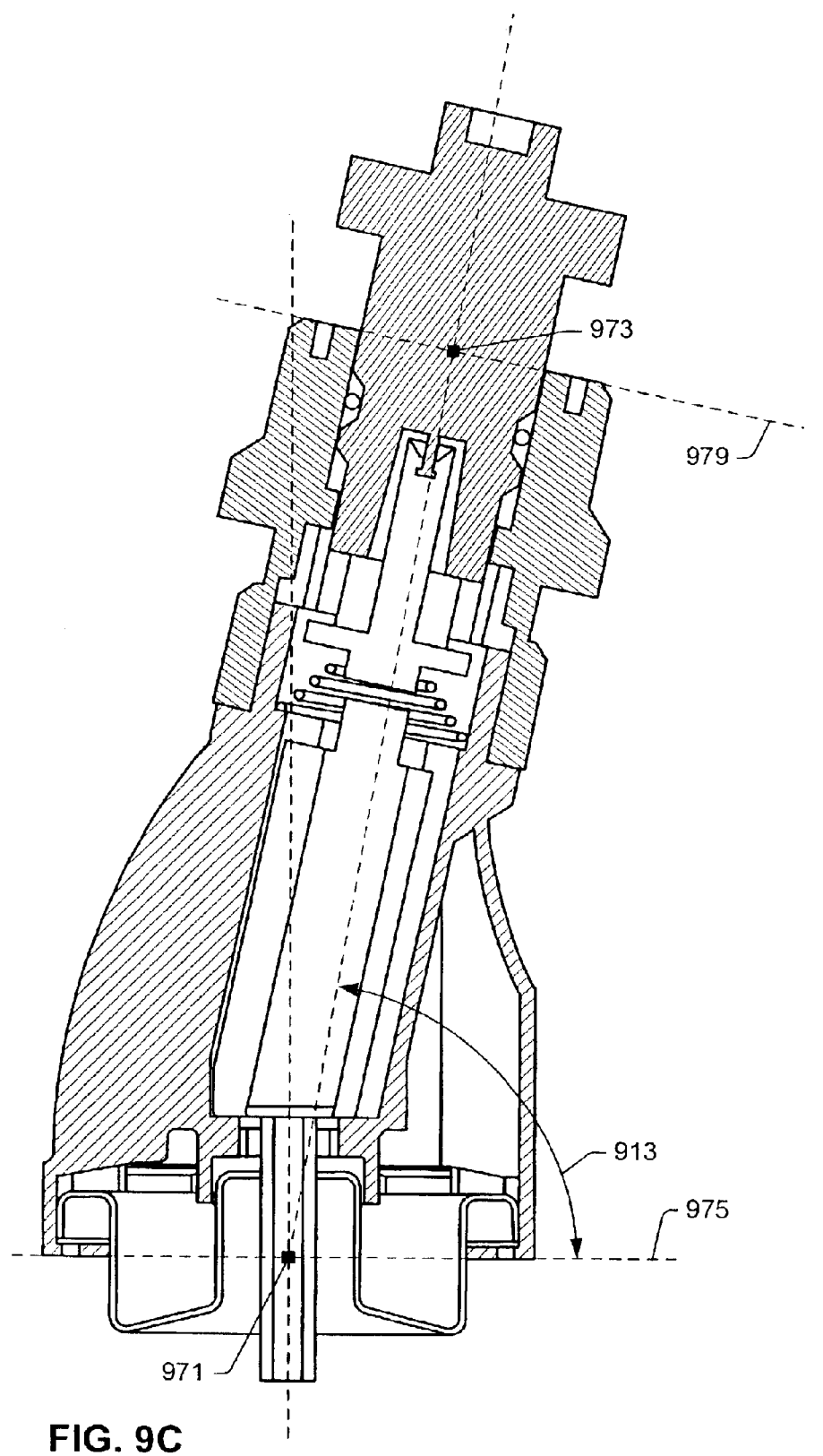

FIGS. 9a, 9b, and 9c illustrate a cross-sectional view of embodiments of different angled housings 101 coupling a pressurized container to an automobile air conditioning system. Automobile air conditioning system 901 may engage housing 101 with automobile air conditioning system valve 902. In an embodiment, plunger 300 disposed in housing 101 may engage automobile air conditioning system valve 902 and pressurized container valve 907 when the housing is coupled to pressurized container 908 and pressed against automobile air conditioning system valve 902. Plunger 300 may be one unbiased piece that extends from pressurized container valve 907 to automobile air conditioning system valve 902 when both are engaged inside housing 101. In certain embodiments, an automobile air conditioning system valve engaging end 903 may be a separate piece from the main body of plunger 300. In an embodiment, the spring 905 may bias automobile air conditioning system valve engaging end 903 forward to form a seal between a ridge 906 on the automobile air conditioning system valve engaging end 903 and insert 904. In an embodiment, the insert 904 may be coupled to the housing interior. Because the automobile air conditioning system valve engaging end 903 is biased by the spring to form a seal, fluid from the pressurized container 908 may be inhibited from leaking out of the second housing end 103 when the housing 101 is not engaging the automobile air conditioning system valve 902. In an embodiment, as the automobile air conditioning system valve 902 is pressed against automobile air conditioning system valve engaging end 903, the automobile air conditioning system valve 902 may open (i.e., the automobile air conditioning system valve 902 may be less resilient than the spring 905) as the automobile air conditioning system valve engaging end 903 is pressed against spring 905 and against the main body of the plunger 300. In an embodiment, the automobile air conditioning system valve engaging end may directly contact the main body of the plunger 300. As the automobile air conditioning system valve engaging end 903 moves backward against the spring 905, the ridge 906 may separate from the insert 904 to allow fluid to flow past the automobile air conditioning system valve engaging end 903. If the housing 101 is pulled away from the automobile air conditioning system valve 902, the spring 905 may bias the automobile air conditioning system valve engaging end 903 forward against insert 904 to again form a seal. In some embodiments, various types of springs may be used, including helical, tapered, and other types of compression springs. In addition, other biasing means besides a spring may be used to bias the moveable plunger. In some embodiments, plunger 300 may have multiple other parts. For example, one end of plunger 300 may engage pressurized container valve 907 and may be biased by a spring while a separate part of the plunger may engage automobile air conditioning system valve 902 and be biased by a spring. As discussed above, lip 911 of the automobile air conditioning system valve may be coupled to housing 101 using bearings 609.

In certain embodiments, the housing 101 may be angled such that an angle 913 of a line between a central point 971 in the first housing end 105 (i.e., a central point on a plane 975 across the bottom of the first housing end 105) to the central point 973 of the second housing end 103 (i.e., a central point on a plane 979 across the second housing end 103) relative to the plane 975 of the first housing end 105 (i.e., the smallest possible angle measured between this line and the plane of the first housing end 105) is approximately in the range of 50 to 80 degrees (or, in some embodiments, approximately in the range of 60–75 degrees, or in other embodiments, approximately in the range of 62–70 degrees). In an embodiment shown in FIG. 9*a*, an angle of 60 degrees may be used. In an embodiment shown in FIG. 9*b*, an angle of 70 degrees may be used. In an embodiment shown in FIG. 9*c*, an angle of 80 degrees may be used. A housing with an angle 913 in this range may allow the housing to align easier with a automobile air conditioning system valve. Furthermore, the angle 913 may allow a user to more easily grasp the housing and pressurized container to operate the quick-connect coupling. In some embodiments, second housing end 103 may lie in a plane that is substantially parallel to a plane of first housing end 105. Other housing configurations may also be contemplated.

Figure 10:
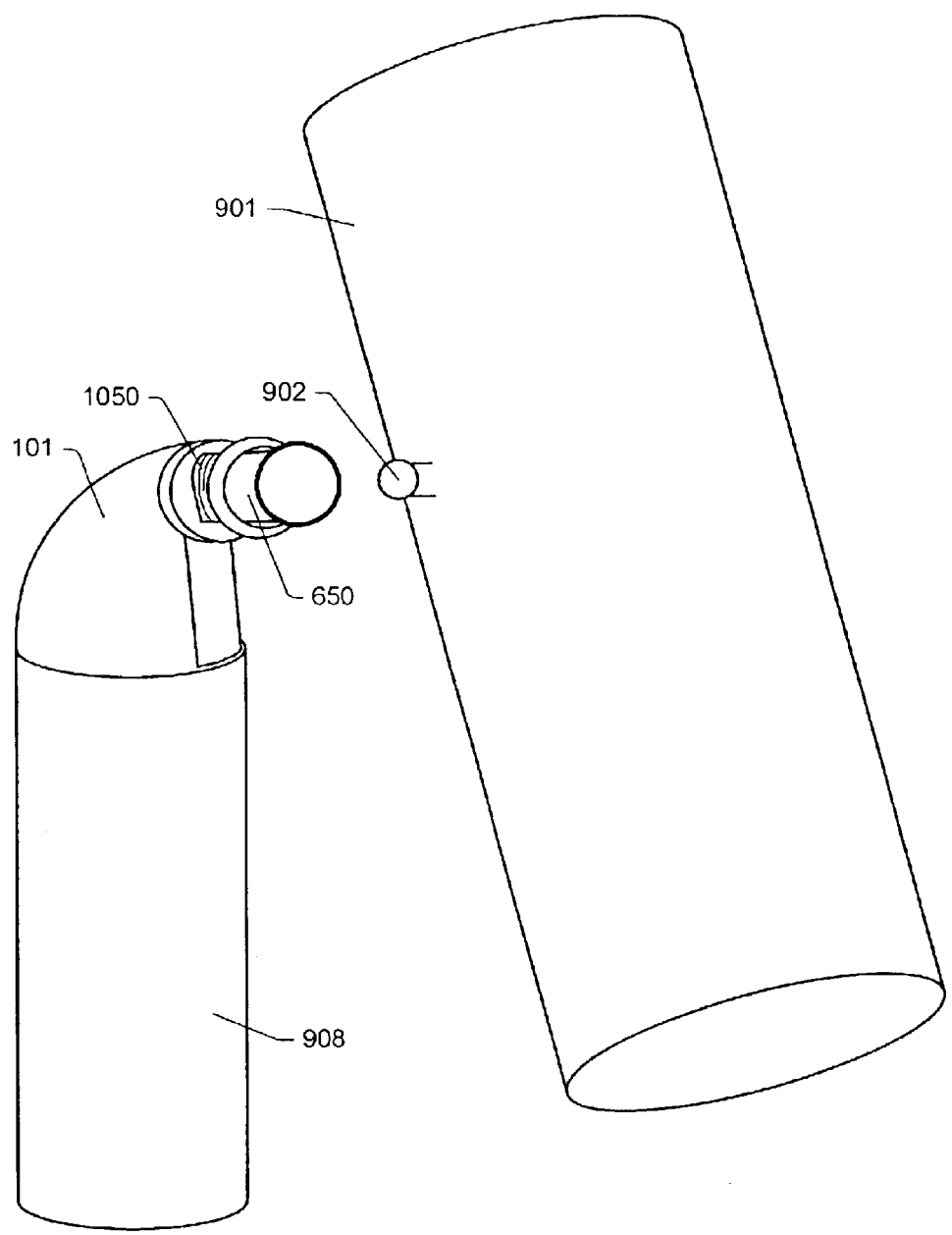
FIG. 10 illustrates the housing on a pressurized container and an automobile air conditioning system, according to one embodiment.

FIG. 10 illustrates an embodiment of a pressurized container with a housing that couples the pressurized container to an automobile air conditioning system. Pressurized container 908 may be coupled to automobile air conditioning system 901 through automobile air conditioning system valve 902 using housing 101. In an embodiment, spring 1050 may bias quick-connect coupling 650.

FIG. 11 illustrates a flowchart for an embodiment to couple housing 101 to an automobile air conditioning system. It should be noted that in various embodiments of the methods described herein, one or more of the methods described may be performed concurrently, in a different order than shown, or may be omitted entirely. Other additional methods may also be performed as desired.

At 1101, a second housing end may be coupled to the automobile air conditioning system using a quick-connect coupling. For example, an outer sleeve of the quick-connect coupling may slip over and hold several bearings in a coupling position with the automobile air conditioning system. In one embodiment, the housing may snap onto the automobile air conditioning system. Other quick-connect coupling configurations may also be used.

At 1103, an automobile air conditioning system valve and a pressurized container valve may be engaged. The automobile air conditioning system valve may be engaged through a second housing end of the housing. In an embodiment, the plunger residing in the interior of the housing may engage the automobile air conditioning system valve and the pressurized container valve when the housing is coupled to the automobile air conditioning system valve. In certain embodiments, a spring may bias the plunger against the automobile air conditioning system valve when the housing is coupled to the automobile air conditioning system. In one embodiment, the second housing end may be coupled to the automobile air conditioning system such that the plunger is held in a position to depress both the pressurized container valve and the automobile air conditioning system valve.

In an embodiment, when the plunger depresses the pressurized container valve and the automobile air conditioning system valve, fluid from the pressurized container may flow out of the pressurized container, through the interior of the housing, and to the open automobile air conditioning system valve. In certain embodiments, the plunger may not depress either the pressurized container valve or the automobile air conditioning system valve unless both valves apply opposing forces to the plunger (i.e., both valves are engaged by the plunger).

At 1105, the second housing end of the housing may be disengaged from the automobile air conditioning system. The user may disengage the second housing end from the automobile air conditioning system by no longer applying pressure to the automobile air conditioning system through the housing. In an embodiment, the user may uncouple the second housing end from the automobile air conditioning system. Other methods for disengaging the second housing end from the automobile air conditioning system may be used depending on the type of coupling between the second housing end and the automobile air conditioning system. In certain embodiments, when the second housing end is disengaged from the automobile air conditioning system, the automobile air conditioning system valve may close to inhibit escape of fluid from the automobile air conditioning system. The pressurized container valve may also close to inhibit further release of fluids from the container.

FIG. 12 illustrates a flowchart for an embodiment to couple housing 101 to an automobile air conditioning system using the quick-connect coupling. It should be noted that in various embodiments of the methods described herein, one or more of the methods described may be performed concurrently, in a different order than shown, or may be omitted entirely. Other additional methods may also be performed as desired.

At 1201, an outer sleeve on the housing may be depressed away from the second housing end. A user's fingers, or other suitable gripping means, may grip an outer lip on the outer sleeve to pull the outer sleeve away from the second housing end down a length of the housing. In certain embodiments, a spring may bias the outer sleeve toward the second housing end. One or more rings may limit movement of the outer sleeve (e.g., inhibit the spring from pushing the outer sleeve off of the housing). In an embodiment, a lip or ring may provide a lower limit for movement of the outer sleeve.

At 1203, the second housing end may be pressed onto the end of (he automobile air conditioning system. A user may align the second housing end with an automobile air conditioning system valve or with a mating protrusion on the automobile air conditioning system. In one embodiment, bearings moveably disposed in a side of the housing may be moveable away from the interior of the housing to allow a lip of the automobile air conditioning system valve to slide into the housing and past the bearings. In some embodiments, the housing may not have bearings.

At 1205, the outer sleeve may be released to bias at least one bearing disposed in the housing inward to couple the housing to the automobile air conditioning system. For example, the bearings may be pushed inward and against the side of the automobile air conditioning system valve as the outer sleeve depresses the bearings. In some embodiments, the housing may not have bearings. The second housing end may snap onto the end of the automobile air conditioning system using a lip placed on the inside of the second housing end to snap over a corresponding lip on the automobile air conditioning system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for dispensing fluid from a pressurized container into an automobile air conditioning system, comprising:
    a housing with a hollow interior with a first housing end to couple the hollow interior to the pressurized container and a second housing end to engage the hollow interior with the automobile air conditioning system;
    a moveable plunger moveably disposed inside the hollow interior of the housing, wherein the moveable plunger has a pressurized container valve engaging end accessible through the first housing end and an automobile air conditioning system valve engaging end accessible through the second housing end;
    wherein the moveable plunger is configured to engage a pressurized container valve and an automobile air conditioning system valve when the first housing end is coupled to the pressurized container and the second housing end is coupled to the automobile air conditioning system;
    wherein the second housing end is coupled to the automobile air conditioning system through a quick-connect coupling;
    wherein the moveable plunger and the housing are configured with a space between the moveable plunger and the housing that allows a fluid to flow in the space when the moveable plunger engages the automobile air conditioning system valve; and
    wherein the moveable plunger is biased by a spring located in the hollow interior.

2. The apparatus of claim 1, wherein the quick-connect coupling comprises at least one bearing moveably disposed in a side of the second housing end and an outer sleeve slideably mounted on the second housing end, wherein at least a portion of the at least one bearing lies inside the hollow interior and another portion of the at least one bearing is engageable with the outer sleeve when the outer sleeve is slid over the at least one bearing to engage the automobile air conditioning system and couple the second housing end to the automobile air conditioning system.

3. The apparatus of claim 2, wherein the outer sleeve is biased to an outer position by a spring, and wherein when the outer sleeve is in the outer position, the at least one bearing couples the housing to the automobile air conditioning system.

4. The apparatus of claim 2, wherein the outer sleeve is configured to be biased to an inner position when a force is applied to a ridge on the outer sleeve in a direction of the inner position.

5. The apparatus of claim 1, wherein the pressurized container valve engaging end of the moveable plunger comprises a grooved surface to allow the fluid to flow out of the pressurized container valve when the pressurized container valve engaging end of the moveable plunger is moved against the pressurized container valve.

6. The apparatus of claim 2, further comprising at least one ring disposed on an outer surface of the housing between the housing and the outer sleeve.

7. The apparatus of claim 1, wherein the fluid comprises R134a refrigerant and a lubricant selected from a group consisting of polyalkylene glycol (PAG), ester, methanol, and ketone.

8. The apparatus of claim 1, wherein the fluid comprises R134a refrigerant and PAG in a mixture approximately in a range of 50 to 80 percent refrigerant by volume.

9. The apparatus of claim 1, wherein the moveable plunger comprises at least two pieces, wherein one piece of the moveable plunger is the automobile air conditioning system valve engaging end that is biased forward by the spring.

10. The apparatus of claim 1, wherein the automobile air conditioning system valve engaging end comprises a ridge and the hollow interior further comprises an insert such that the ridge and the insert form a seal when the spring biases the automobile air conditioning system valve engaging end to contact the insert.

11. The apparatus of claim 1, wherein the automobile air conditioning system valve engaging end is in direct contact with at least one other piece of the moveable plunger such that when the automobile air conditioning system valve engaging end presses against the spring and the at least one other piece of the moveable plunger, the moveable plunger engages the pressurized container valve.

12. The apparatus of claim 1, wherein the spring inhibits rotation of the moveable plunger.

13. The apparatus of claim 1, wherein an angle of a line between a central point on a plane across a bottom of the first housing end to a central point on a plane across the second housing end relative to the plane across the bottom of the first housing end is approximately in a range of 50 to 80 degrees.

14. The apparatus of claim 1, wherein an angle of a line between a central point on a plane across a bottom of the first housing end to a central point on a plane across the second housing end relative to the plane across the bottom of the first housing end is approximately in a range of 60 to 75 degrees.

15. A method, comprising:
    coupling a second housing end of a housing to an automobile air conditioning system valve using a quick-connect coupling, wherein the housing comprises a first housing end coupled to a pressurized container, wherein the housing comprises a hollow interior that is accessible through the first housing end and the second housing end, wherein a moveable plunger is disposed within the hollow interior such that the moveable plunger is accessible through the first housing end and the second housing end;
    engaging the automobile air conditioning system valve with the moveable plunger through the second housing end, wherein when the automobile air conditioning system valve engages the moveable plunger through the second housing end, a pressurized container valve is engaged by the moveable plunger and a fluid from the pressurized container valve flows through the hollow interior of the housing between the first housing end and the second housing end and to an automobile air conditioning system;
    disengaging the second housing end from the automobile air conditioning system; and
    wherein the moveable plunger is biased by a spring located in the hollow interior.

16. The method of claim 15, wherein coupling the second housing end comprises:
    depressing an outer sleeve away from the second housing end, wherein the outer sleeve is coupled to the second housing end around a perimeter of the second housing end;

wherein when the outer sleeve is depressed, at least one bearing disposed in a wall of the housing near the second housing end which has at least a portion of the at least one bearing inside the hollow interior, is free to move outward;

pressing the second housing end onto an end of the automobile air conditioning system; and releasing the outer sleeve, wherein the released outer sleeve is biased toward the second housing end, wherein the outer sleeve presses against the at least one bearing when the outer sleeve slides over the at least one bearing, and wherein the at least one bearing couples the second housing end to the automobile air conditioning system.

17. The method of claim 16, further comprising decoupling the second housing end from the automobile air conditioning system, wherein decoupling the second housing end from the automobile air conditioning system includes depressing the outer sleeve and pulling the housing off of the automobile air conditioning system.

18. The method of claim 15, wherein an angle of a line between a central point on a plane across a bottom of the first housing end to a central point on a plane across the second housing end relative to the plane across the bottom of the first housing end is approximately in a range of 50 to 80 degrees.

19. The method of claim 15, wherein an angle of a line between a central point on a plane across a bottom of the first housing end to a central point on a plane across the second housing end relative to the plane across the bottom of the first housing end is approximately in a range of 60 to 75 degrees.

20. An apparatus for dispensing fluid from a pressurized container into an automobile air conditioning system, comprising:

a housing with a hollow interior, wherein the hollow interior has a first housing end and a second housing end;

a moveable plunger located in the hollow interior, wherein the moveable plunger has a pressurized container valve engaging end accessible through the first housing end and an automobile air conditioning system valve engaging end accessible through the second housing end, wherein the moveable plunger is configured to move back and forth along a predetermined path, and further comprising a spring configured to bias the movable plunger during use;

wherein the first housing end is configured to couple the housing to the pressurized container comprising a pressurized container valve;

wherein the second housing end is configured to engage the automobile air conditioning system comprising an automobile air conditioning system valve;

wherein the moveable plunger is configured to engage the automobile air conditioning system valve and the pressurized container valve during use; and wherein the moveable plunger and the housing are configured to allow a fluid to flow in the hollow interior during use.

21. The apparatus of claim 20, wherein the fluid comprises R134a refrigerant and a lubricant selected from a group consisting of PAG, ester, methanol, and ketone.

22. The apparatus of claim 20, wherein the fluid comprises R134a refrigerant and PAG in a mixture approximately in a range of 50 to 80 percent refrigerant by volume.

23. The apparatus of claim 20, wherein the second housing end is further configured to couple to the automobile air conditioning system using a quick-connect coupling.

24. The apparatus of claim 23, wherein the second housing end comprises at least one bearing moveably disposed in a side of the second housing end, wherein at least a portion of the at least one bearing is inside the hollow interior, and wherein the second housing end further comprises an outer sleeve slideably mounted to the second housing end, wherein at least one portion of the at least one bearing is engageable with the outer sleeve when the outer sleeve is slid over the at least one bearing, and wherein, when the outer sleeve is slid over the at least one bearing, the at least one bearing engages the automobile air conditioning system to couple the second housing end to the automobile air conditioning system.

25. The apparatus of claim 24, wherein the outer sleeve is biased to an outer position by a spring.

26. The apparatus of claim 24, wherein the outer sleeve is configured to be biased to an inner position when a force is applied to a ridge on the outer sleeve in a direction of the inner position.

27. The apparatus of claim 20, wherein an angle of a line between a central point on a plane across a bottom of the first housing end to a central point on a plane across the second housing end relative to the plane across the bottom of the first housing end is approximately in a range of 50 to 80 degrees.

28. The apparatus of claim 20, wherein an angle of a line between a central point on a plane across a bottom of the first housing end to a central point on a plane across the second housing end relative to the plane across the bottom of the first housing end is approximately in a range of 60 to 75 degrees.

29. The apparatus of claim 20, wherein the moveable plunger comprises at least two pieces, wherein one piece of the moveable plunger is the automobile air conditioning system valve engaging end that is biased forward by the spring.

30. The apparatus of claim 29, wherein the automobile air conditioning system valve engaging end comprises a ridge and the hollow interior further comprises an insert such that the ridge and the insert form a seal when the spring biases the automobile air conditioning system valve engaging end to contact the insert.

31. The apparatus of claim 29, wherein the automobile air conditioning system valve engaging end is in direct contact with at least one other piece of the moveable plunger such that when the automobile air conditioning system valve engaging end presses against the spring and the at least one other piece of the moveable plunger, the moveable plunger engages the pressurized container valve.

32. The apparatus of claim 1, wherein the moveable plunger comprises a first piece configured to engage the pressurized container valve, and a second piece configured to engage the automobile air conditioning system valve, and wherein the spring biases the first piece and the second piece.

33. The apparatus of claim 1, wherein the moveable plunger comprises a first moveable plunger piece configured to engage the pressurized container valve, and a second moveable plunger piece configured to engage the automobile air conditioning system valve, wherein the spring biases the first moveable plunger piece and the second moveable plunger piece, wherein the spring biases the first moveable plunger piece towards the first housing end, and the spring biases the second moveable plunger piece towards the second housing end.

34. An apparatus for dispensing fluid from a pressurized container into an automobile air conditioning system, comprising:

a housing with a hollow interior with a first housing end to couple the hollow interior to the pressurized container and a second housing end to engage the hollow interior with the automobile air conditioning system;

a first moveable plunger piece and a second moveable plunger piece, wherein the first moveable plunger piece and the second moveable plunger piece are moveably disposed inside the hollow interior of the housing, wherein the first moveable plunger piece has a pressurized container valve engaging end accessible through the first housing end and the second moveable plunger piece has an automobile air conditioning system valve engaging end accessible through the second housing end;

wherein the first moveable plunger piece is configured to engage a pressurized container valve and the second moveable plunger piece is configured to engage an automobile air conditioning system valve when the first housing end is coupled to the pressurized container and the second housing end is coupled to the automobile air conditioning system;

wherein the second housing end is coupled to the automobile air conditioning system through a quick-connect coupling; and wherein the first moveable plunger piece and the second moveable plunger piece are biased by a spring located in the hollow interior.

35. The apparatus of claim 34, wherein the first moveable plunger piece is configured to engage the pressurized container valve, and the second moveable plunger piece is configured to engage the automobile air conditioning system valve, and wherein the spring biases the first moveable plunger piece and the second moveable plunger piece.

36. The apparatus of claim 34, wherein the first moveable plunger piece is configured to engage the pressurized container valve, and the second moveable plunger piece is configured to engage the automobile air conditioning system valve, wherein the spring biases the first moveable plunger piece and the second moveable plunger piece, and wherein the spring biases the first moveable plunger piece towards the first housing end, and the spring biases the second moveable plunger piece towards the second housing end.

37. The apparatus of claim 34, wherein the quick-connect coupling comprises at least one bearing moveably disposed in a side of the second housing end and an outer sleeve slideably mounted on the second housing end, wherein at least a portion of the at least one bearing lies inside the hollow interior and another portion of the at least one bearing is engageable with the outer sleeve when the outer sleeve is slid over the at least one bearing to engage the automobile air conditioning system and couple the second housing end to the automobile air conditioning system.

38. The apparatus of claim 37, wherein the outer sleeve is biased to an outer position by a spring, and wherein when the outer sleeve is in the outer position, the at least one bearing couples the housing to the automobile air conditioning system.

39. The apparatus of claim 37, wherein the outer sleeve is configured to be biased to an inner position when a force is applied to a ridge on the outer sleeve in a direction of the inner position.

40. The apparatus of claim 37, further comprising at least one ring disposed on an outer surface of the housing between the housing and the outer sleeve.

41. The apparatus of claim 34, wherein the pressurized container valve engaging end of the first moveable plunger piece comprises a grooved surface to allow the fluid to flow out of the pressurized container valve when the pressurized container valve engaging end of the first moveable plunger piece is moved against the pressurized container valve.

42. The apparatus of claim 34, wherein the fluid comprises R134a refrigerant and a lubricant selected from a group consisting of polyalkylene glycol (PAG), ester, methanol, and ketone.

43. The apparatus of claim 34, wherein the fluid comprises R134a refrigerant and PAG in a mixture approximately in a range of 50 to 80 percent refrigerant by volume.

44. The apparatus of claim 34, wherein the automobile air conditioning system valve engaging end of the second moveable plunger piece comprises a ridge and the hollow interior further comprises an insert such that the ridge and the insert form a seal when the spring biases the automobile air conditioning system valve engaging end of the second moveable plunger piece to contact the insert.

45. The apparatus of claim 34, wherein the first moveable plunger piece and the second moveable plunger piece are in contact with the spring such that when the second moveable plunger piece presses against the spring, the first moveable plunger piece engages the pressurized container valve.

46. The apparatus of claim 34, wherein the spring inhibits rotation of the first moveable plunger piece and the second moveable plunger piece.

47. The apparatus of claim 34, wherein an angle of a line between a central point on a plane across a bottom of the first housing end to a central point on a plane across the second housing end relative to the plane across the bottom of the first housing end is approximately in a range of 50 to 80 degrees.

48. The apparatus of claim 34, wherein an angle of a line between a central point on a plane across a bottom of the first housing end to a central point on a plane across the second housing end relative to the plane across the bottom of the first housing end is approximately in a range of 60 to 75 degrees.

49. The apparatus of claim 34, wherein the first moveable plunger piece, the second moveable plunger piece, and the housing are configured with a space between the first moveable plunger piece and the housing and between the second moveable plunger piece and the housing, wherein the space allows the fluid to flow in the space when the second moveable plunger piece engages the automobile air conditioning system valve.

50. The apparatus of claim 34, wherein the spring is between the first moveable plunger piece and the second moveable plunger piece.

* * * * *